US009120504B2

(12) United States Patent
Bebernes et al.

(10) Patent No.: US 9,120,504 B2
(45) Date of Patent: Sep. 1, 2015

(54) STEERING LINKAGE INTERFACE BETWEEN STEERING CYLINDER AND GROUND DRIVE PUMP DISPLACEMENT CONTROL ARMS

(71) Applicant: Deere & Company, Moline, IL (US)

(72) Inventors: Thomas D. Bebernes, Ottumwa, IA (US); Stephen E O'Brien, Ottumwa, IA (US); Thomas A. Nichols, Eldon, IA (US); Mitchell R. Usasz, Ottumwa, IA (US); Kyle R. Teach, Ottumwa, IA (US); David V. Rotole, Bloomfield, IA (US); Walter C. Wright, Pella, IA (US)

(73) Assignee: Deere & Company, Moline, IL (US)

( * ) Notice: Subject to any disclaimer, the term of this patent is extended or adjusted under 35 U.S.C. 154(b) by 174 days.

(21) Appl. No.: 13/833,598

(22) Filed: Mar. 15, 2013

(65) Prior Publication Data

US 2014/0138167 A1     May 22, 2014

Related U.S. Application Data

(63) Continuation-in-part of application No. 13/681,626, filed on Nov. 13, 2012.

(51) Int. Cl.
*B62D 11/02*     (2006.01)
*B62D 11/00*     (2006.01)
*B62D 5/093*     (2006.01)

(52) U.S. Cl.
CPC .............. *B62D 11/005* (2013.01); *B62D 5/093* (2013.01); *B62D 11/02* (2013.01)

(58) Field of Classification Search
CPC ............................... B62D 11/02; B62D 11/005

USPC .................................. 280/6.48, 6.3, 6.32, 6.4
See application file for complete search history.

(56) References Cited

U.S. PATENT DOCUMENTS

| 5,649,606 | A | 7/1997 | Bebernes et al. |
| 5,953,978 | A | 9/1999 | Boher et al. |
| 6,285,936 | B1 | 9/2001 | Boher et al. |
| 7,721,830 | B2 * | 5/2010 | Dunn et al. ................... 180/6.48 |

(Continued)

FOREIGN PATENT DOCUMENTS

| RU | 2420421 C2 | 6/2011 |
| RU | 2488261 C2 | 7/2013 |

OTHER PUBLICATIONS

Eurasian Search Report issued in counterpart application No. 201301179, dated May 5, 2014 (2 pages).

*Primary Examiner* — Joseph Rocca
*Assistant Examiner* — Marlon Arce (57) ABSTRACT

A four-bar linkage is provided as a mechanical interface for transferring respective outputs from a speed/direction control device and a hydraulic steering cylinder to displacement control arms of a pair of pumps of a dual-path hydrostatic transmission including a pair of motors respectively coupled for driving a pair of front wheels of a vehicle. The hydraulic steering cylinder is fixed and has a piston rod slidably coupled to an input arm of the four-bar linkage in such a way that a rotation speed decrease occurs as the arm and a linked control plate are pivoted from a neutral position, the control plate transferring pivotal movement to effect differential movement of the displacement control arms. This results in the vehicle speed decreasing during a turn.

16 Claims, 5 Drawing Sheets

(56) References Cited

U.S. PATENT DOCUMENTS

| | | |
|---|---|---|
| 7,913,800 B2 | 3/2011 | Graeve et al. |
| 7,918,304 B2 | 4/2011 | Perry et al. |
| 2006/0149446 A1 | 7/2006 | Nelson |
| 2007/0017712 A1 | 1/2007 | Dunn |
| 2008/0083570 A1* | 4/2008 | Bares et al. .................. 180/6.48 |
| 2008/0116001 A1 | 5/2008 | Graeve et al. |
| 2009/0152828 A1 | 6/2009 | Bebernes et al. |
| 2010/0111712 A1 | 5/2010 | Rotole et al. |

* cited by examiner

STEERING LINKAGE INTERFACE BETWEEN STEERING CYLINDER AND GROUND DRIVE PUMP DISPLACEMENT CONTROL ARMS

REFERENCE TO RELATED APPLICATION

This application is a continuation-in-part of U.S. application Ser. No. 13/681,626 filed Nov. 20, 2012.

FIELD OF THE INVENTION

The present invention relates to steering systems for controlling the operation of dual path hydrostatic ground wheel drive motors, and more specifically relates to a steering four-bar linkage interface between a steering cylinder and displacement control arms of the respective pumps of the dual path hydrostatic ground wheel drive transmission.

BACKGROUND OF THE INVENTION

It is well known to control steering, speed and direction of a vehicle having a dual path hydrostatic transmission coupled for driving a pair of front ground wheels by effecting changes in the displacement and direction of fluid flow through a pair of variable displacement pumps respectively coupled to a pair of wheel drive motors. One known way of controlling the displacement of the pumps is to provide an interface linkage, for example a four-bar linkage, which receives inputs for steering control generated, for example, by turning a steering wheel, and inputs for speed and direction control generated, for example, by moving a hydro-lever.

A disadvantage in some known control input and four-bar linkage configurations is that the control input for effecting steering results in the turning speed increasing as an steering input member of the four-bar-linkage is increasingly pivoted from a neutral position, which results in the speed of turning increasing, which is not a desirable steering characteristic from the view point of many operators.

SUMMARY OF THE INVENTION

According to the present invention, there is provided an improved mechanical linkage for serving as an interface for separately receiving speed/direction and steering inputs and passing them on for controlling the displacements of a pair of pumps coupled for circulating fluid to a pair of front wheel drive motors in a manner which overcomes the aforementioned unwanted steering characteristic.

An object of the invention is to provide said steering input being provided by a hydraulic steering cylinder having a fixed barrel containing a piston rod for providing a steering input to a pivotable input member of a linkage including a pivotable output member coupled for pivoting together with the input member and coupled for effecting changes in the displacement of a pair of pumps, with the coupling between the input member and rod being so as to effect a decrease in the rate of change of the displacement of the first and second pumps as the distance the steering cylinder moves from a neutral position increases, thereby effecting a decrease in the speed of steering during a turn.

This and other objects of the invention will become apparent from a reading of the ensuing description together with the appended drawings.

DESCRIPTION OF THE PREFERRED EMBODIMENT

Figure 1:
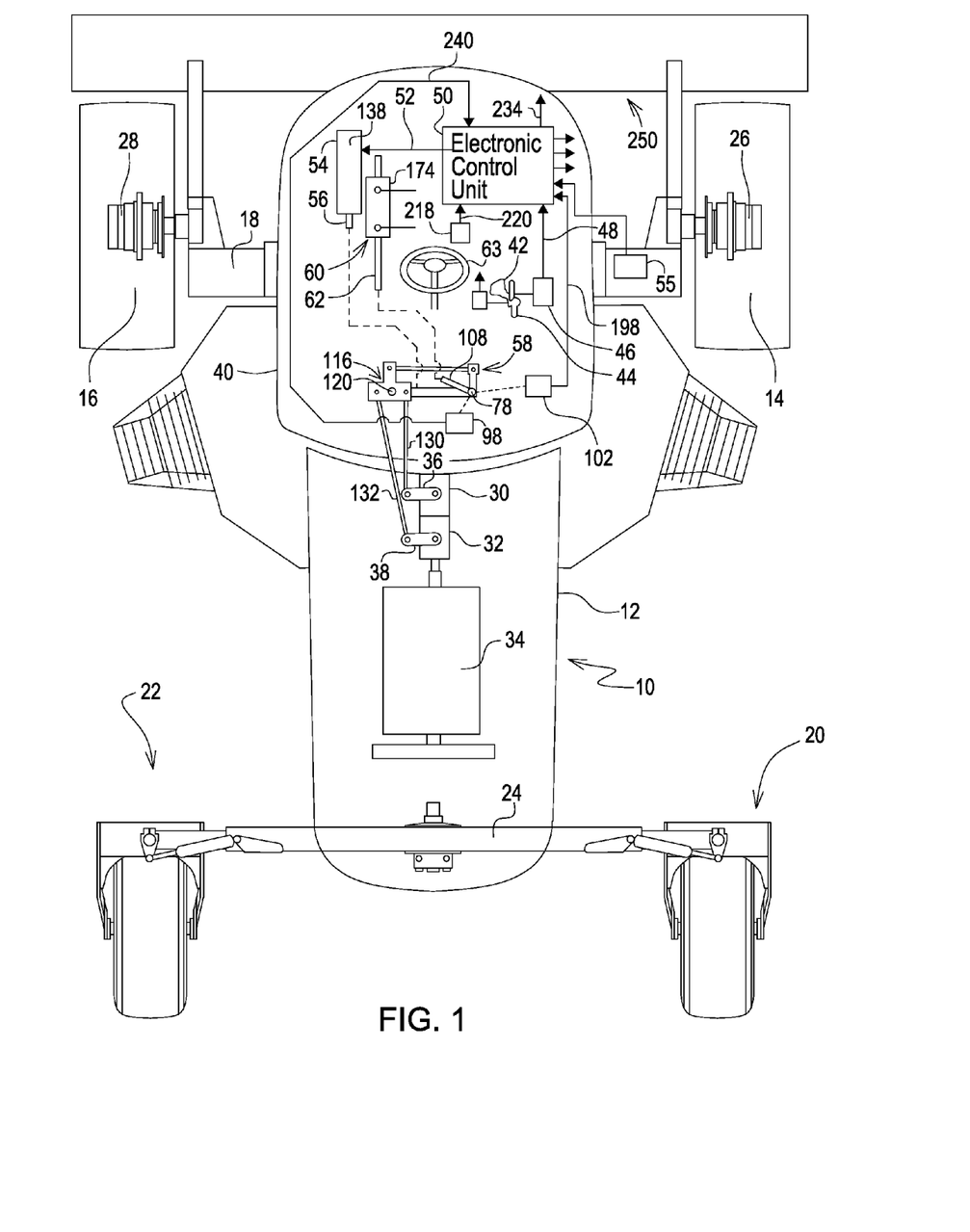
FIG. 1 is a schematic representation of a self-propelled vehicle having a dual-path hydrostatic drive transmission and transmission pump displacement controls including an interface linkage constructed in accordance with the present invention.

Referring now to FIG. 1, there is shown a self-propelled agricultural vehicle 10, here shown as being the type used for carrying a forward-mounted implement 250 such as a mower-conditioner, for example. The vehicle 10 is shown schematically and includes a main frame 12 supported on right- and left-hand front drive wheels 14 and 16, respectively, mounted to opposite ends of a front axle assembly 18, and right- and left-hand, steerable rear ground wheel assemblies 20 and 22 are respectively caster-mounted to opposite ends of a rear axle assembly 24.

The front drive wheels 14 and 16 are respectively driven by right- and left-hand hydraulic motors 26 and 28 forming part of a dual-path hydrostatic transmission and can be caused to be driven at different speeds or one motor can be driven forward and the other in reverse so that the vehicle 10 may be steered. The dual-path hydrostatic transmission further includes first and second, variable displacement, reversible pumps 30 and 32, respectively, coupled in fluid communication with the motors 26 and 28 by respective pairs of supply/return lines (not shown), as is well known in the art. The pumps 30 and 32 are coupled for being driven by a prime mover, here shown as an internal combustion engine 34 mounted on the frame 12, the engine also providing power for driving other driven components of the vehicle and for driving driven components of the implement 250. The pumps 30 and 32 include respective swash plates to which displacement control arms 36 and 38 are connected, the arms each being mounted for pivotal movement from a zero displacement neutral position, with increasing forward and rearward movement from a neutral position respectively effecting increasing displacement of fluid in opposite directions of flow so as to produce increasing forward and reverse driving speeds of the motors 26 and 28.

An operator seated within a cab 40 located on a forward area of the frame 12 can control the speed and direction of travel of the vehicle 10 by manual operation of a hydro-lever 42 located rightward of a seat (not shown), the hydro-lever acting to initiate forward or rearward movement of the displacement control arms 36 and 38. Specifically, the hydro-lever 42 is mounted for movement along a guide slot 44 having straight fore-and-aft extending front and rear sections offset from each other and joined by a cross-over section, with the displacement control arms 36 and 38 being in corresponding neutral positions when the lever 42 is in the cross-over section of the guide slot. A lever position sensor 46 is associated with the lever 42 and generates an electrical speed and direction input signal 48 corresponding to the lever position, and may include information such as whether or not the lever is presently moving, the direction of movement, and the instantaneous speed of movement. The speed and direction input signal is represented by a lead 48 connected to an electronic control unit (ECU) 50, the control unit processing the signal and outputting a proportional speed/direction control signal 52 to an electric linear actuator 54, the signal 52 being represented by the lead connecting the ECU 50 and actuator 54. A travel speed sensor 55 is provided for generating a signal corresponding to the travel speed, this signal also being coupled to the ECU 50 and is processed for effecting steering rate as a function of travel speed.

The actuator 54 includes a linearly driven output rod 56 that is coupled to a four-bar linkage 58, shown schematically in FIG. 1, that serves as a linkage interface for transmitting linear motion of the output rod 56 to the pump displacement control arms 36 and 38 in a manner described below in more detail. A double-acting steering control cylinder 60 has a piston rod 62 also coupled to the four-bar linkage 54 such that linear motion of the piston rod 62 is transmitted to the control arms 36 and 38 in a manner described below in more detail, the steering control cylinder 60 being controlled through operation of a primary steering control valve 170 (FIG. 5) operated in response to manual steering inputs received from a steering wheel 63 located in the cab 40, also described below in further detail. In addition to or separately from the primary steering control valve 170, the steering control cylinder 60 may be operated automatically by an electro-hydraulic automatic steering control valve 210 (FIG. 5) that may receive automatic inputs from various sources including GPS based sources, for example.

Figure 2:
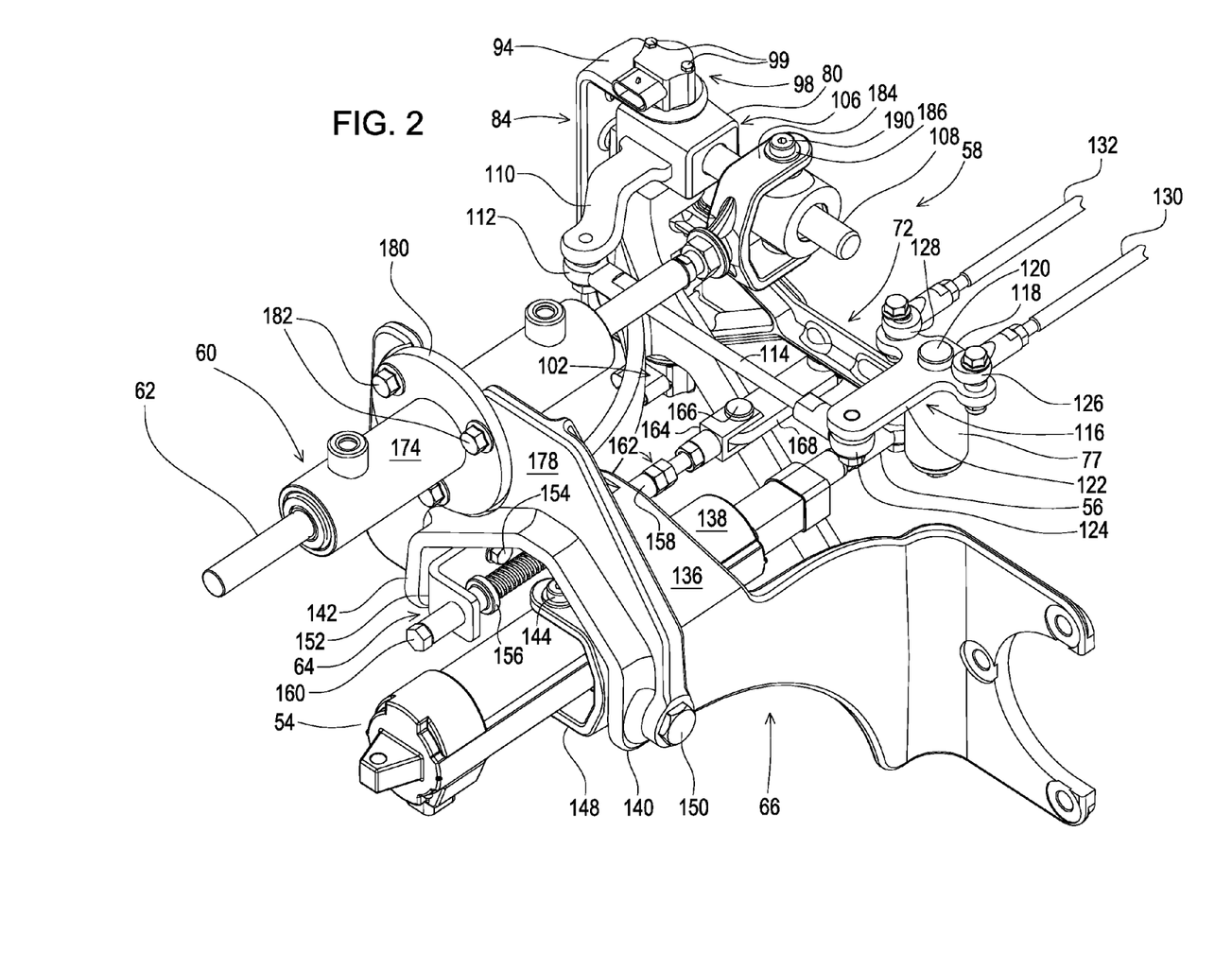
FIG. 2 is a right front perspective view of the interface linkage of the present invention.
Figure 3:
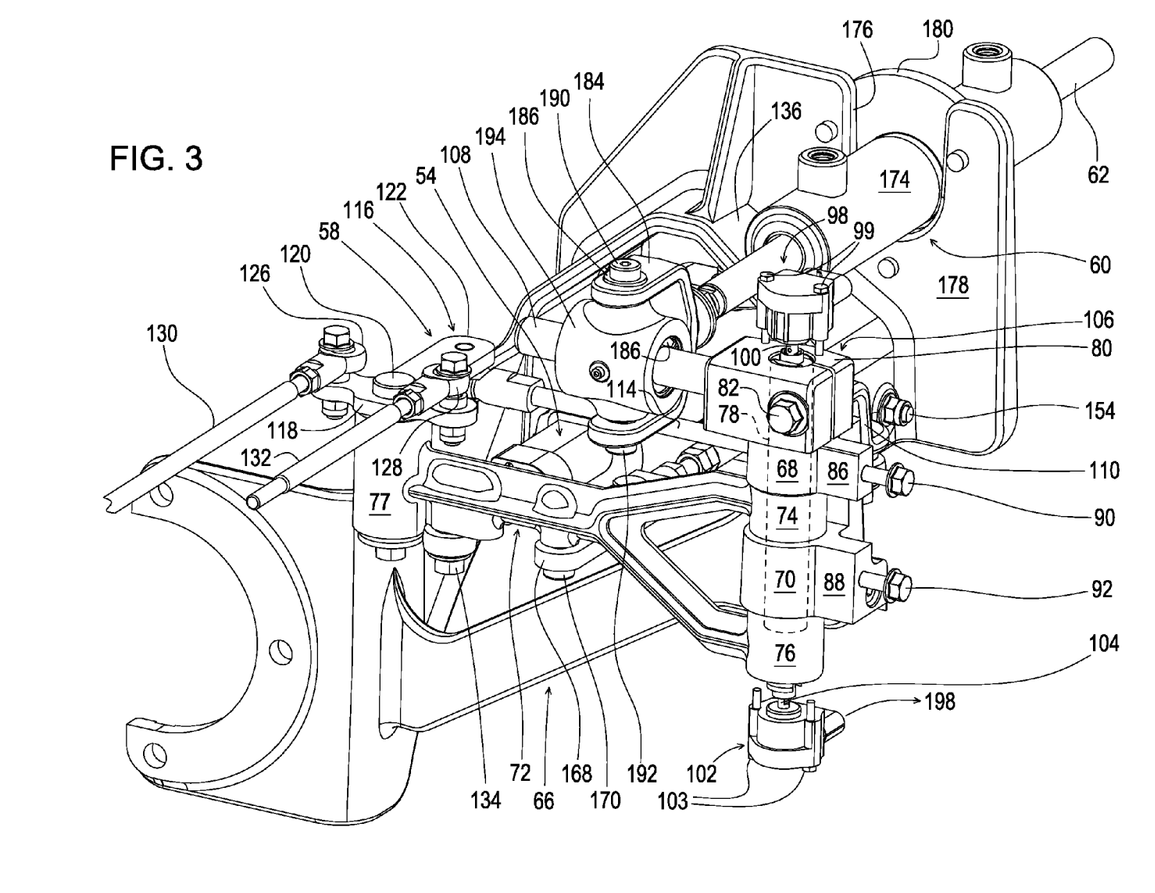
FIG. 3 is right rear perspective view of the interface linkage shown in FIG. 2, but with the mounting bracket for the rotary potentiometers being removed for clarity.
Figure 4:
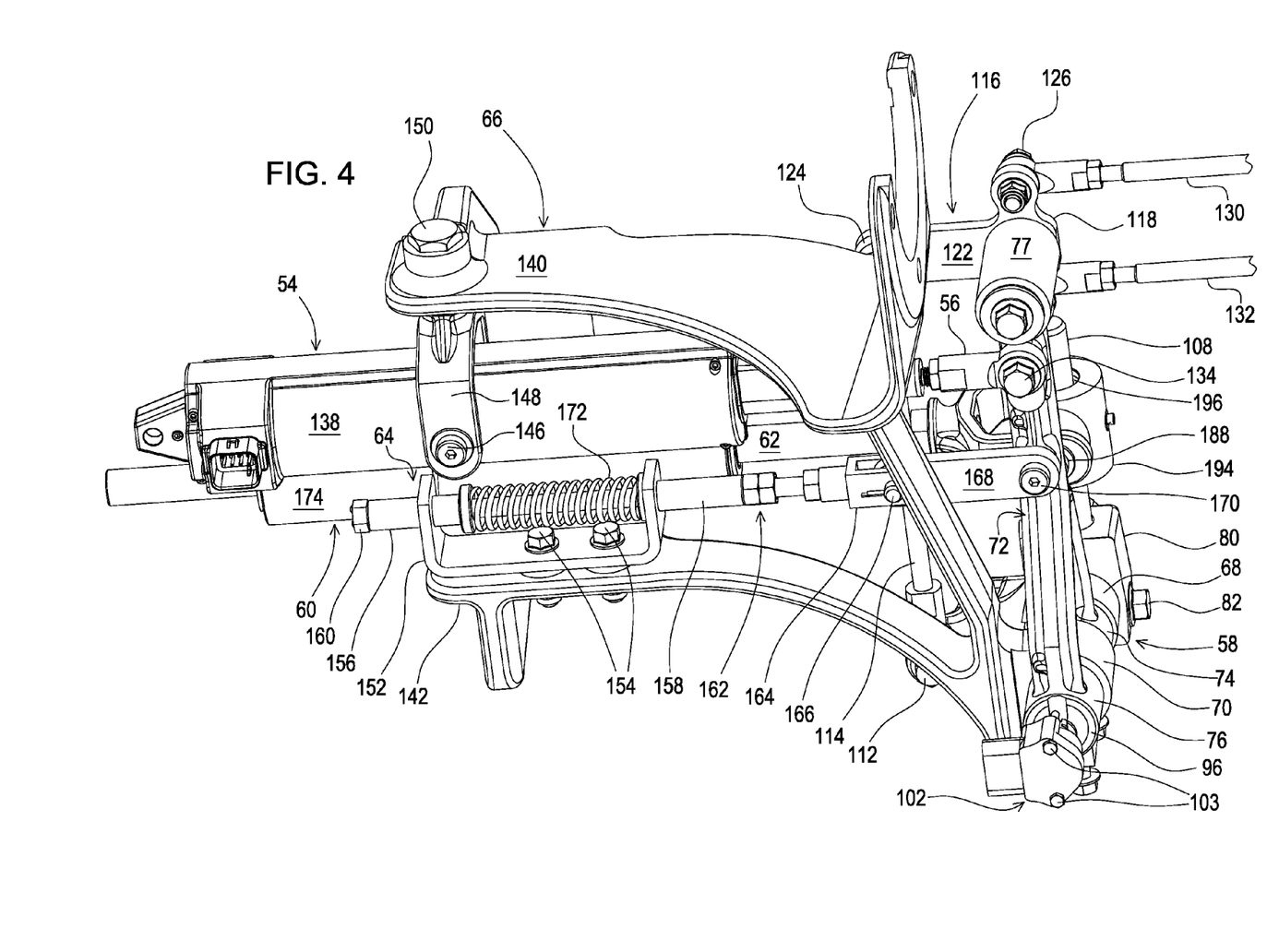
FIG. 4 is a bottom perspective view of the interface linkage shown in FIG. 2

Referring now also to FIGS. 2-4, it can be seen that the four-bar linkage 58 together with the linear electric actuator 54, hydraulic steering cylinder 60 and a return-to-neutral mechanism 64 are all supported from a frame assembly 66 that is secured to form an integral part of the main frame 12. Specifically, with reference to FIG. 3, it can be seen that a right rear region of the frame 66 is defined by vertically aligned and spaced apart, upper and lower fixed collars 68 and 70, respectively. The four-bar linkage 58 includes a transversely extending first link defined by an elongate speed and direction control arm 72 having a bifurcated right end portion terminating in axially aligned, vertically spaced upper and lower cylindrical sleeves 74 and 76, respectively, and having a left end defined by an upright cylindrical sleeve 77. The upper sleeve 74 of the arm 72 is snuggly received between the upper and lower collars 68 and 70 and the lower sleeve 76 is snuggly engaged with a bottom surface of the lower collar 70. An upright post or pin 78 extends axially through and is mounted for pivoting within a cylindrical bore defined through the collars 68 and 70 and through the sleeves 74 and 76. An upper region of the post 78 is located above the fixed upper collar 68 and is received within an upright through bore provided in a block-like clamping member 80 having a right side provided with an upright slot extending leftward to the through bore. A clamping bolt 82 is received in a threaded bore extending crosswise through the slot and is tightened so as to draw the slot together and tighten the clamping member 80 onto the post 78, the bolt 82 also being received in a fore-and-aft notch (not visible) provided in the post 78 such that the bolt fixes the post lengthwise within the clamping member. An U-shaped, sensor mounting member 84 has an upright bight portion engaged with co-planar, vertical right side surfaces of upper and lower mounting pads 86 and 88, respectively formed integrally with the upper and lower collars 68 and 70. Upper and lower stud bolts 90 and 92, respectively, project through upper and lower holes provided in the bight of the member 84 and are threaded into aligned holes provided in the mounting pads so as to tightly secure the member to the pads. The sensor mounting member 84 has upper and lower, horizontal legs 94 (FIGS. 2) and 96 (FIG. 4), respectively, disposed closely adjacent a top surface of the clamping member 80 and a bottom surface of the lower cylindrical sleeve 76 of the control arm 72 and respectively contain circular openings aligned with the upright bores respectively provided in clamping member 80 and sleeve 76.

An upper rotary motion sensor in the form of a rotary potentiometer 98 includes a housing mounted to the upper leg 94 of the mounting member 84 by mounting screws 99, with the potentiometer having a sensing arrangement, shown partially at 101, projecting through the hole in the upper leg 94 for sensing the rotation of the post 78 in a well known manner for a purpose explained below. Similarly, a lower potentiometer 102 includes a housing mounted to the lower leg 96 of the mounting member 84 by screws 103, with the potentiometer having a sensing arrangement, shown partially at 104, for sensing the rotation of the lower sleeve 76 of the control arm 72 about the post 78 in a manner well known in the art for a purpose explained below.

The clamping member 80 defines a central portion of a generally L-shaped bell-crank 106 having a transverse input leg 108 defined by a cylindrical rod and a fore-and-aft extending output leg 110 defining a second link of the four-bar linkage 58 and having an end pivotally coupled, as at 112, to a left end of a third link 114 of the four-bar linkage. The third link 114 has a length commensurate with the length of, and extends generally parallel to, the speed and direction control arm 72. A T-shaped steering output control plate 116 has a top 118 fixed to a second upright post or pin 120 pivotally mounted within the upright sleeve 77 and thus defines a second pivot axis. The post 120 is located centrally between opposite ends of the top 118 of the T. A stem 122 of the T-shaped plate 116 is oriented parallel to, and has a length commensurate with, the output leg 110 of the bell crank 106 and has an end pivotally coupled, as at pivot connection 124, to a right end of the third link 114, as viewed in FIG. 2, the steering output control plate 116 thereby forming a fourth and final link of the four-bar linkage 58. Opposite ends of the top 118 of the T-shaped output plate 116 are respectively coupled, as at pivot connections 126 and 128, to motion transfer links 130 and 132, respectively, having rear ends pivotally coupled to the pump displacement control arms 36 and 38 of pumps 30 and 32. It is here noted that the output control plate 116 need not be T-shaped but may have any shape so long as the pivot connections with the plate define an approximate isosceles triangle and so long as the pivot post 120 is located approximately midway between the connections defining the base of the triangle, with it being possible in some cases to adjust the locations of these latter two connections in order to vary the steering characteristics of the vehicle.

As can best be seen in FIGS. 2 and 4, the output rod 56 of the linear electric actuator 54 is coupled, as by a pivot connection 134, to the speed and direction control arm 72 at a location adjacent the sleeve 77. A front right region of the frame assembly 66, as viewed in FIG. 2, is provided with an inverted, generally U-shaped portion 136 for accommodating and supporting an elongate, fore-and-aft extending housing 138 of the actuator 54. Specifically, the U-shaped frame portion 136 includes right and left, fore-and-aft extending upright sides 140 and 142 defining a clearance space between them in which the actuator housing 138 is disposed. The actuator housing 138 has upper and lower axially aligned upright stub pins 144 and 146, respectively, defined by screws threaded into holes provided in upper and lower housing surface locations approximately halfway between opposite ends of the housing. The stub pins 144 and 146 are respectively pivotally mounted within openings provided in upper and lower limbs of a leftward opening yoke 148 mounted to an inside surface of the right side wall 140 by a mounting bolt 150. Thus, it will be appreciated that the actuator 54 is mounted to the frame assembly 64 such that it can pivot about an upright axis defined by the pins 144 and 146 when actuator 54 is actuated to either retract or extend the control rod 56 to respectively effect forward and or rearward pivoting movement of the speed and direction control arm 72 about the upright axis defined by the first post 78.

The return-to-neutral mechanism 64 is provided as a safety device to establish a neutral or zero displacement condition in the pumps 30 and 32 in the event that the actuator 54 fails when the vehicle 10 is traveling. The mechanism 64 extends fore-and-aft in a space between the actuator housing 138 and an inside surface of the left side 142 of the inverted U-shaped frame portion 136. The mechanism 64 includes a U-shaped rod guide 152 secured against the side 142 by a pair of mounting bolts 154 extending through spaced holes provided in the bottom of the U and into aligned holes provided in the frame portion left side. Fore-and-aft aligned holes are provided in the legs of the guide 152, with front and rear, headed plastic tubes 156 and 158 being respectively inserted through the holes such that the heads of the tubes are between the legs of the guide 152. A long bolt 160 is inserted through the tubes 156 and 158, with a head of the bolt being located forward of the front tube 156, with threads being located rearward of the rear tube 158 and receiving a nut and jam nut assembly 162 and with the rear end of the bolt being coupled to a clevis 164 pivotally coupled, as by a pin 166, to a front end of a short link 168 having a rear end pivotally coupled to the speed and direction control arm 72 by a pin 170 formed by a screw screwed into the bottom of the arm 72. A return spring 172 is received on the stem of the bolt 160 between, and has opposite ends engaged with, the headed ends of the tubes 156 and 158. Thus, when the output rod 56 of the linear actuator 54 is moved forward to cause forward pivoting of the speed and direction control arm 72 from a neutral position corresponding to the neutral positions of the displacement control arms 36 and 38, the tube 158 is moved forward together with the nut and jam nut assembly 160 to compress the spring 172 against the head of the tube 156. In a similar manner, if the output rod 56 of linear actuator 54 is moved rearward to cause the control arm 72 to be pivoted to the rear from its neutral position, the tube 156 is moved rearward together with the head of the bolt 160 and compresses the spring 172 against the head of the tube 158. In either case, the loaded spring 172 will result in the arm 72 being moved back to a position corresponding to the neutral position of the displacement control arms 36 and 38 of the pumps in the event the actuator 54 loses power.

The hydraulic steering cylinder 60 includes a cylindrical barrel 174 received within an upwardly opening U-shaped notch 176 provided in a top edge of an upright transverse support plate 178 joined to a top location of the inverted U-shaped frame portion 136 of the frame assembly 66. The barrel 174 is fixed to the plate 178 by a ring-shaped mounting plate 180 having a central opening receiving the barrel and being fixed to the barrel, as by welding, and secured to the support plate 178 by stud bolts 182 projecting through holes in the mounting plate 180 and screwed into threaded holes provided in the support plate 178. The piston rod 62 extends axially through the barrel 174 and is fixed to a piston (not shown) mounted for sliding within the barrel. The piston rod 62 is disposed approximately at a right-angle to the input leg 108 of the bell crank 106 when the steering control cylinder 60 is in a neutral position corresponding to the steering output control plate 116 being in a neutral non-steering position. A rear end of the piston rod 62 is joined to a clevis 184 having upper and lower arms respectively carrying upper and lower ball connectors 186 and 188, which, in turn, are respectively received on upper and lower upright pins 190 and 192 screwed into diametrically opposite locations of a tubular cylindrical slide member 194 containing a cylindrical sleeve 196 received for sliding on the input leg 108 of the bell-crank 106. The sleeve 196 is preferably constructed of low-friction plastic material so as to slide freely along the leg 108. It is noted that the slide connection disclosed is preferred because of its simplicity and ruggedness. However, a slide connection defined by a pin received in a slot extending lengthwise within the input leg could be used instead, or some other lost-motion connection could be used.

In any event, it will be appreciated that by virtue of the first post 78 being mounted for pivoting freely within the sleeves 74 and 76, and the second post 120 being mounted for pivoting freely within the sleeve 77, steering inputs can be made to the T-shaped steering control plate 116 by way of the steering cylinder 60, bell crank 106 and third link 114 without causing any pivotal movement of the speed and direction control arm 72 so as to effect a change in speed or direction of the vehicle 10. Likewise, speed and direction inputs can be made for pivoting the control arm 72 by way of the linear actuator 54 without causing any rotation of the steering control plate 116 so as to effect steering.

Thus, it will be appreciated that during straight ahead travel, the operator can increase the speed of the vehicle 10 by pushing the hydro-lever 42 forward in the guide slot 44 beyond the cross-over position with the lever position sensor 46 acting to send an appropriate speed and direction signal 52 to the ECU 50 for processing, the ECU then sending a control signal to the electrical linear actuator 54 which drives the output rod 56 forward an appropriate amount causing forward pivoting of the speed and direction control arm 72 of the four-bar linkage 58, with the steering control plate 116, together with the motion transfer rods 130 and 132, moving forward causing an equal amount of motion to be imparted to the displacement control arms 36 and 38 of the pumps 30 and 32 so that an equal increase in speed of the hydraulic motors 26 and 28 results. Due to the operation of the four-bar linkage 58, no pivoting motion of the steering control plate 116 about an upright axis defined by the second post 120 will result so that the motors 26 and 28 are not driven at differential speeds to cause steering. Pivotal movement of the lower sleeve 76, and hence the speed and direction control arm 72, about an upright axis defined by the first post 78, is sensed by the lower rotary potentiometer 102 which sends a representative arm position signal 198 to the ECU 50 which processes the signal and terminates the speed and direction control signal 52 once the control arm 72 has pivoted an amount corresponding to that needed for effecting the speed/direction change commanded by the movement of the hydro-lever 42.

Figure 5:
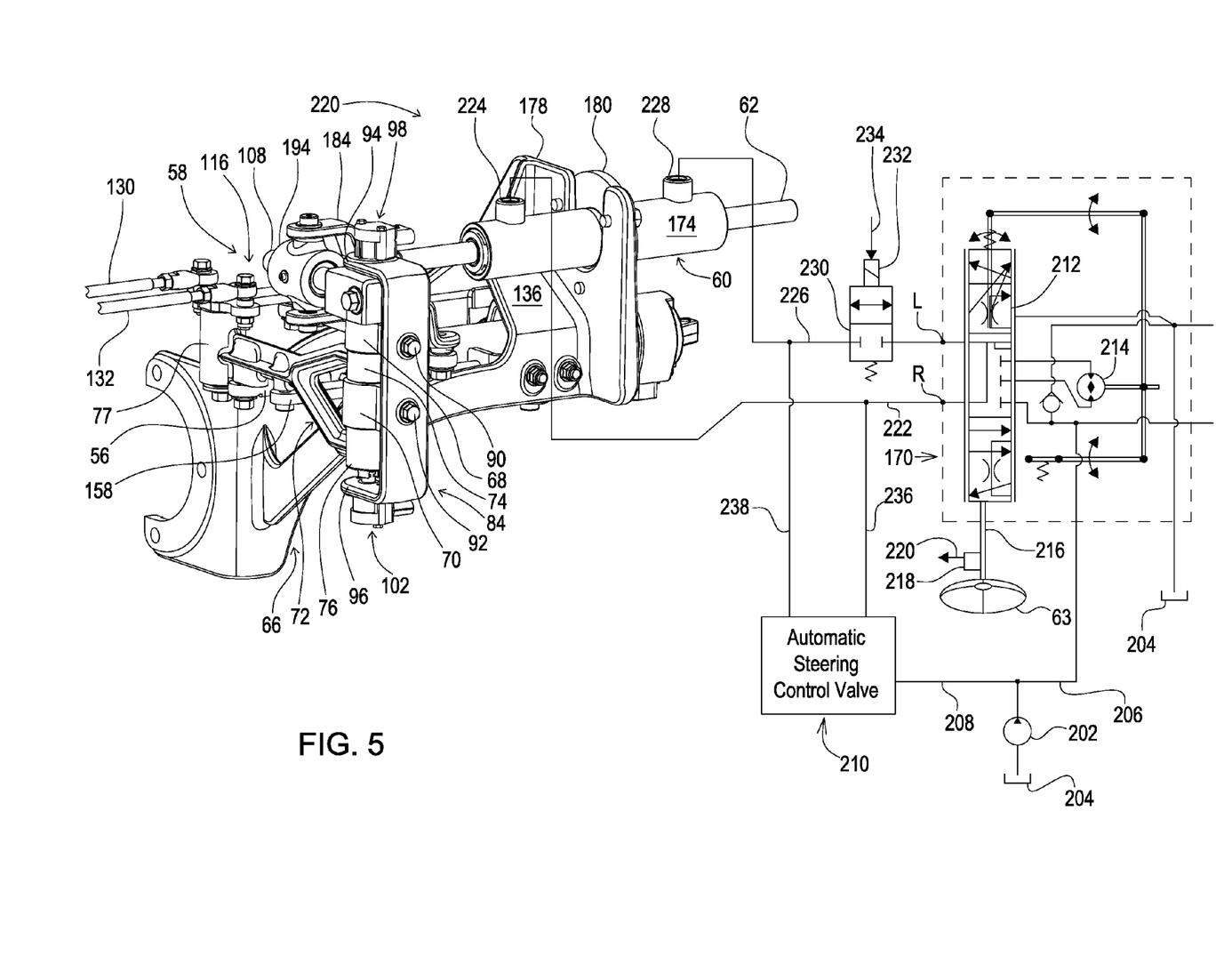
FIG. 5 is a schematic representation showing that portion of the hydrostatic transmission control for effecting steering control.

Referring now also to FIG. 5, there is shown an electro-hydraulic steering control system 200 for controlling operation of the steering control cylinder 60, and hence for controlling operation of the motors 26 and 28 driving the front wheels 14 and 16. The steering control system 200 is preferably of a type configured for varying the steering ratio so as to vary the number of lock-to-lock turns of the steering wheel 63 for effecting a steering operation, or so as to vary other types of operator input devices in a relatively precise manner so as to accommodate an operator request and/or to accommodate a variety of operating modes of the vehicle 10.

The steering control system 200 includes a fixed displacement charge pump 202 which draws hydraulic fluid from a sump 204 and delivers relatively low pressure fluid (300 psi, for example) to first and second supply line branches 206 and 208 respectively leading to the primary steering control valve 170 and to the automatic steering control valve 210, the latter being indicated functionally only by a box, but which is of a type usable with a global positioning system, for example, or with other systems capable of automatically generating signals useable for steering.

The primary steering valve 170 acts in combination with the automatic steering valve 210 to control the operation of the extensible and retractable hydraulic steering control cylinder 60. Specifically, the primary steering valve 170 includes a spring-centered, multi-port spool and sleeve fluid control valve 212 that is in fluid communication with a fluid metering gerotor 214. The steering wheel 63 is coupled to one end of a steering shaft 216 having an opposite end coupled for effecting operation of the fluid control valve 212. Under normal driving conditions, a rotation of the steering wheel 63 actuates the fluid control valve 212 which ultimately powers rotation of the gerotor 214. A steering input sensor 218 is associated with the steering shaft 216 and generates a corresponding electrical steering input signal 220 that is coupled to the ECU 50, as indicated by the lead coupling the sensor to the ECU (see FIG. 1). The steering input signal 220, has a purpose explained below, and corresponds to the rotational motion of the steering wheel 63, and may include information such as whether or not the steering wheel 63 is currently rotating, the direction of rotation, and the instantaneous speed of rotation.

The primary steering valve 170 includes a right steering fluid port R and a left steering fluid port L, with the right port R being directly coupled, as by line 222, to a right steering port 224 of the steering control cylinder 60, and with the left steering fluid port L being coupled, as by a line 226, to a left steering port 228 of the cylinder 60. The line 226 contains a two-position, solenoid-operated, neutral centering valve 230, which is normally deactivated and in a blocking or "off" position preventing flow between the steering valve port L and the left steering cylinder port 228, when no steering operation is taking place. A solenoid 232 of the centering valve 230 is coupled for receiving an electrical steering centering or "on" signal 234 indicated by a broken lead extending from the ECU 50 to the solenoid 232, in response to the ECU receiving the steering input signal 220.

Thus, assuming that the operator initiates a right turn by turning the steering wheel 63 to the right, the solenoid 232 will receive the "on" signal 220 causing the valve 230 to shift so as to couple the valve port L to the left steering port 228 of the steering control cylinder 60. At the same time, the fluid control valve 212 will shift upward, as viewed in FIG. 5, coupling the fluid supplied by the first branch line 208 to the gerotor 214, which, in turn, is coupled to meter flow to the steering cylinder port 224 by way of the right steering fluid port R and line 222, while coupling the steering cylinder port 228 to sump 204 by way of the line 226, solenoid valve 230 and valve port L, such that the cylinder rod 62 shifts forward to pivot the control plate 116 clockwise, as viewed in FIG. 5, moving the motion transfer rod 130 rearward and the rod 132 forward causing the displacement of the pump 30 to be decreased or reversed for effecting a slow down or reverse of the motor 26 while the displacement of the pump 32 is increased for increasing the speed of the motor 28 in the forward direction, thereby effecting a right turn. A left turn is initiated in a similar manner by turning the steering wheel 63 to the left so as to cause the fluid control valve 212 to shift downward, as viewed in FIG. 5, resulting in pressure fluid being routed through the left steering valve port L to the left steering cylinder port 228 while the right steering cylinder port 224 is coupled to the sump 204 so as to cause the piston rod 62 to be shifted rearward, thereby causing the output control plate 116 to be rotated counter clockwise so as to act through the motion transfer rods 130 and 132 to effect a slow down or reverse of the drive motor 28 while speeding up the drive motor 26, thereby effecting a left turn.

While the automatic steering control valve 210 is coupled in parallel with the primary steering valve 170 to the lines 222 and 226 respectively by supply lines 236 and 238, and is designed to supplement working fluid flow to the steering cylinder 63 to make up for a known leakage characteristic of the control valve 170, this feature of the control system 200 is not part of the present invention and is not further described or illustrated. Also not forming a part of the present invention and not fully described nor illustrated is the electrically responsive valve arrangement of the automatic steering control valve 210 by which the valve 210 operates, after receiving an appropriate centering control signal from the ECU 50, to send working fluid to one or the other of the lines 222 and 226 for returning the steering cylinder 60, and hence the steering output plate 116 to corresponding neutral positions. The ECU 50 sends this control signal once the steering commanded by turning of the steering wheel 63 is accomplished as determined by the upper rotary potentiometer 98 that sends out a rotary position signal 240 to the ECU 50 corresponding to the rotary movement of the first post 78 that results from the input received from the steering actuator 60 by the input leg 108 of the bell crank 106 and transferred to the second post 120, and hence the displacement control output plate 116 by the four-bar linkage links 110 and 114.

The present invention resides in the steering cylinder 60 and the four-bar linkage 58 and, more particularly, resides in the fixed barrel 174 of the cylinder 60 and to the slidable connection by which the piston rod 62 is coupled to the steering input leg 108 of the bell crank 106. When the steering cylinder 60 and steering output plate 116 are in their respective neutral positions, the piston rod 62 will be oriented approximately at a right angle with the leg 108. Consequently, due to the action of the four-bar-linkage 58, this substantially right-angle relationship is maintained even when the speed/direction control arm 72 is swung about the upright post 78 to effect speed and direction changes. Thus, when effecting right or left turning respectively by rightward or leftward movement of the piston rod 62, as viewed in FIG. 3, the slide member 194 will slide outwardly away from the upright post 78 so as to increase the lever arm between the slide member 194 and the post 78 resulting in a decrease in the speed at which the bell crank 106 rotates, which in turn results in a decrease in the speed at which the output plate 116 rotates and in a decrease in the rate at which the vehicle 10 turns.

Once the desired turn is completed, turning of the steering wheel 63 will stop, with the automatic steering control valve 210 being energized to send working fluid to an appropriate one of the right and left steering ports 224 and 228 for again centering the steering control cylinder 60 and output plate 116, this energizing of the valve 210 being in response to receiving a centering control signal sent from the ECU 50 after the ECU determines from the signal 240 sent by the upper rotary potentiometer 98 that the position of the post 78 and hence the bell crank 106 are in a position indicating that the desired steering has been accomplished. The steering control cylinder 60 is then ready for the next steering operation.

Having described the preferred embodiment, it will become apparent that various modifications can be made without departing from the scope of the invention as defined in the accompanying claims.

The invention claimed is:

1. In a vehicle including first and second front wheels respectively driven by first and second motors; first and second reversible, variable displacement pumps respectively coupled for supplying fluid to said motors and a steering system including a steering control interface linkage having an input member coupled for receiving a steering input and having an output member coupled to the input member and to displacement controllers of said first and second pumps for transferring movement received by said input member to effect differential adjustment of said displacement controllers thereby effecting steering of the vehicle, the improvement comprising: said steering input being provided by a hydraulic steering cylinder having a fixed barrel and having a piston rod movable in opposite directions in said barrel from a neutral position corresponding to a centered, non-steering position of the output member; a coupling configured for effecting a connection between said piston rod and said input member so as to effect a decrease in the rate of change of the displacement of the first and second pumps as the distance the piston rod of the steering cylinder moves from said a neutral position increases, thereby effecting a decrease in the speed of steering during a turn.

2. In a vehicle including first and second front wheels respectively driven by first and second motors; first and second reversible, variable displacement pumps respectively coupled for supplying fluid to said motors and a steering system including a steering control interface linkage having an input member coupled for receiving a steering input and having an output member coupled to the input member and to displacement controllers of said first and second pumps for transferring movement received by said input member to effect differential adjustment of said displacement controllers thereby effecting steering of the vehicle, the improvement comprising: said steering input being provided by a hydraulic steering cylinder having a fixed barrel and having a piston rod; a coupling effecting a connection between said rod and said input member so as to effect a decrease in the rate of change of the displacement of the first and second pumps as the distance the steering cylinder moves from a neutral position increases, thereby effecting a decrease in the speed of steering during a turn; and said steering control interface linkage being is a four-bar linkage including first and second links respectively defined by said input and output members, and including a third link having opposite ends pivotally mounted to the first and second links, and a fourth link extending parallel to the third link, with the first and fourth links being mounted for rotating about an upright fixed first pivot axis of the linkage, with the output member being mounted to the fourth link for rotating about an upright movable second pivot axis of the linkage, and with the third link having a first end pivotally mounted to the first link and a second end pivotally mounted to the second link, whereby pivotal movement of the input member is transmitted to the output member by way of the third link independently of any pivotal movement of the fourth link about said upright first axis.

3. The vehicle, as defined in claim 2, wherein said input member is a bell-crank having an input leg and an output leg, with the output leg defining said first link, and wherein said coupling is between said steering cylinder rod and said input leg such the effective length of the input leg increases as the distance the steering cylinder moves from said neutral position increases, thereby effecting a decrease in the speed at which the input and output members pivot.

4. The vehicle, as defined in claim 2, wherein said input member is a bell-crank having input and output legs, with the output leg defining said first link and with the input leg being defined by a rod; and said coupling including a slide member connected to said rod of the hydraulic steering cylinder and being mounted for sliding on said input leg of the input member.

5. The vehicle, as defined in claim 2, wherein said coupling connecting the cylinder rod to said input member of the four-bar linkage is a lost-motion coupling.

6. A steering control linkage for controlling the displacement of a pair of reversible, variable displacement pumps respectively coupled for supplying fluid to a pair of vehicle front wheel drive motors, comprising: a four-bar linkage including a first link defined by an elongate speed and direction control arm having a first end mounted for pivoting about a fixed upright pivot post defining a first pivot axis and having a second end carrying an upright second pivot post defining a movable second pivot axis disposed parallel to said first pivot axis; a steering input bell crank fixed to said first upright post and thereby being mounted for pivoting about said first pivot axis and having a first leg and a second leg; a steering output plate being fixed to said second upright post and thereby being mounted for pivoting about said second pivot axis; a connecting link extending at least generally parallel to said speed and direction control arm and having opposite ends respectively pivotally coupled to said second leg of the steering input bell crank and to a first pivot location of said steering output plate, with the distance between the connection of the connecting link with the second leg of the steering input bell crank and the first upright axis being substantially equal to the distance between the connection of the connecting link with the output plate and the second pivot axis; first and second motion transfer links having respective first ends coupled to said output plate at second and third locations spaced substantially equally from opposite sides of said second pivot axis, and having respective second ends coupled to first and second displacement control arms of said first and second pumps; a steering cylinder having a fixed barrel through which extends a piston rod; and a lost-motion connection coupling an end of said piston rod to said first leg of the steering input bell crank such that the speed of rotation of the steering input bell crank decreases as the steering cylinder moves the steering input bell crank from a neutral position corresponding to a neutral position of the displacement control arms of the first and second pumps.

7. A steering control linkage for controlling the displacement of a pair of reversible, variable displacement pumps respectively coupled for supplying fluid to a pair of vehicle front wheel drive motors, comprising: a four-bar linkage including a first link defined by an elongate speed and direction control arm having a first end mounted for pivoting about a fixed upright pivot post defining a first pivot axis and having a second end carrying an upright second pivot post defining a movable second pivot axis disposed parallel to said first pivot axis; a steering input bell crank fixed to said first upright post and thereby being mounted for pivoting about said first pivot axis and having a first leg and a second leg; a steering output plate being fixed to said second upright post and thereby being mounted for pivoting about said second pivot axis; a connecting link extending at least generally parallel to said speed and direction control arm and having opposite ends respectively pivotally coupled to said second leg of the steering input bell crank and to a first pivot location of said steering output plate, with the distance between the connection of the connecting link with the second leg of the steering input bell crank and the first upright axis being substantially equal to the distance between the connection of the connecting link with the output plate and the second pivot axis; first and second motion transfer links having respective first ends coupled to said output plate at second and third locations spaced substantially equally from opposite sides of said second pivot axis, and having respective second ends coupled to first and second displacement control arms of said first and second pumps; a steering cylinder having a fixed barrel through which extends a piston rod; and a lost-motion connection coupling an end of said piston rod to said first leg of the steering input bell crank such that the speed of rotation of the steering input bell crank decreases as the steering cylinder moves the steering input bell crank from a neutral position corresponding to a neutral position of the displacement control arms of the first and second pumps; and > a powered control input device coupled for causing rotation of said speed and direction control arm about said first axis independently of rotation of the steering input bell crank about said first axis.

8. The steering control linkage, as defined in claim 7, wherein said powered control input device is a linear electric motor.

9. The steering control linkage, as defined in claim 8, and further including a return to neutral mechanism including a spring-biased control rod coupled to said speed and direction control arm, with the spring bias acting to resist movement of said speed and direction control arm from a position corresponding to said displacement control arms being in neutral, zero displacement effecting positions, whereby a power failure of said linear electric motor when actuated will result in the displacements of the pumps being returned to neutral.

10. A steering control linkage for controlling the displacement of a pair of reversible, variable displacement pumps respectively coupled for supplying fluid to a pair of vehicle front wheel drive motors, comprising: a four-bar linkage including a first link defined by an elongate speed and direction control arm having a first end mounted for pivoting about a fixed upright pivot post defining a first pivot axis and having a second end carrying an upright second pivot post defining a movable second pivot axis disposed parallel to said first pivot axis; a steering input bell crank fixed to said first upright post and thereby being mounted for pivoting about said first pivot axis and having a first leg and a second leg; a steering output plate being fixed to said second upright post and thereby being mounted for pivoting about said second pivot axis; a connecting link extending at least generally parallel to said speed and direction control arm and having opposite ends respectively pivotally coupled to said second leg of the steering input bell crank and to a first pivot location of said steering output plate, with the distance between the connection of the connecting link with the second leg of the steering input bell crank and the first upright axis being substantially equal to the distance between the connection of the connecting link with the output plate and the second pivot axis; first and second motion transfer links having respective first ends coupled to said output plate at second and third locations spaced substantially equally from opposite sides of said second pivot axis, and having respective second ends coupled to first and second displacement control arms of said first and second pumps; a steering cylinder having a fixed barrel through which extends a piston rod; a lost-motion connection coupling an end of said piston rod to said first leg of the steering input bell crank such that the speed of rotation of the steering input bell crank decreases as the steering cylinder moves the steering input bell crank from a neutral position corresponding to a neutral position of the displacement control arms of the first and second pumps; said first leg of the steering input bell crank being a rod and said lost-motion connection being defined by a slide member coupled to said one end of the piston rod and being mounted for sliding along said first leg of the steering input bell crank.

11. The steering control linkage, as defined in claim 10, wherein said first leg of the steering input bell crank is cylindrical and said slide member includes a cylindrical tube mounted for sliding along said first leg.

12. A steering control linkage for controlling the displacement of a pair of reversible, variable displacement pumps respectively coupled for supplying fluid to a pair of vehicle front wheel drive motors, comprising: a four-bar linkage including a first link defined by an elongate speed and direction control arm having a first end mounted for pivoting about a fixed upright pivot post defining a first pivot axis and having a second end carrying an upright second pivot post defining a movable second pivot axis disposed parallel to said first pivot axis; a steering input bell crank fixed to said first upright post and thereby being mounted for pivoting about said first pivot axis and having a first leg and a second leg; a steering output plate being fixed to said second upright post and thereby being mounted for pivoting about said second pivot axis; a connecting link extending at least generally parallel to said speed and direction control arm and having opposite ends respectively pivotally coupled to said second leg of the steering input bell crank and to a first pivot location of said steering output plate, with the distance between the connection of the connecting link with the second leg of the steering input bell crank and the first upright axis being substantially equal to the distance between the connection of the connecting link with the output plate and the second pivot axis; first and second motion transfer links having respective first ends coupled to said output plate at second and third locations spaced substantially equally from opposite sides of said second pivot axis, and having respective second ends coupled to first and second displacement control arms of said first and second pumps; a steering cylinder having a fixed barrel through which extends a piston rod; a lost-motion connection coupling an end of said piston rod to said first leg of the steering input bell crank such that the speed of rotation of the steering input bell crank decreases as the steering cylinder moves the steering input bell crank from a neutral position corresponding to a neutral position of the displacement control arms of the first and second pumps; and a steering input motion sensor for sensing the amount of pivotal movement from its neutral position that the steering input bell crank undergoes about said first upright post in response to being moved by said steering cylinder.

13. The steering control linkage, as defined in claim 12, wherein the steering input bell crank includes a clamping block fixed to said first and second legs and containing a through bore located along said first pivot axis and receiving an upper end of said first post; and clamping structure for selectively clamping said first post in place in a position corresponding to said steering input motion sensor indicating a null, non-rotated position of said steering input bell crank, thus indicating that no steering is taking place.

14. A steering control linkage for controlling the displacement of a pair of reversible, variable displacement pumps respectively coupled for supplying fluid to a pair of vehicle front wheel drive motors, comprising: a four-bar linkage including a first link defined by an elongate speed and direction control arm having a first end mounted for pivoting about a fixed upright pivot post defining a first pivot axis and having a second end carrying an upright second pivot post defining a movable second pivot axis disposed parallel to said first pivot axis; a steering input bell crank fixed to said first upright post and thereby being mounted for pivoting about said first pivot axis and having a first leg and a second leg; a steering output plate being fixed to said second upright post and thereby being mounted for pivoting about said second pivot axis; a connecting link extending at least generally parallel to said speed and direction control arm and having opposite ends respectively pivotally coupled to said second leg of the steering input bell crank and to a first pivot location of said steering output plate, with the distance between the connection of the connecting link with the second leg of the steering input bell crank and the first upright axis being substantially equal to the distance between the connection of the connecting link with the output plate and the second pivot axis; first and second motion transfer links having respective first ends coupled to said output plate at second and third locations spaced substantially equally from opposite sides of said second pivot axis, and having respective second ends coupled to first and second displacement control arms of said first and second pumps; a steering cylinder having a fixed barrel through which extends a piston rod; a lost-motion connection coupling an end of said piston rod to said first leg of the steering input bell crank such that the speed of rotation of the steering input bell crank decreases as the steering cylinder moves the steering input bell crank from a neutral position corresponding to a neutral position of the displacement control arms of the first and second pumps; and a speed and direction input sensor for sensing the amount of pivotal movement that the speed and direction control arm undergoes about said first upright pivot axis.

15. A steering control linkage for controlling the displacement of a pair of reversible, variable displacement pumps respectively coupled for supplying fluid to a pair of vehicle front wheel drive motors, comprising: a four-bar linkage including a first link defined by an elongate speed and direction control arm having a first end mounted for pivoting about a fixed upright pivot post defining a first pivot axis and having a second end carrying an upright second pivot post defining a movable second pivot axis disposed parallel to said first pivot axis; a steering input bell crank fixed to said first upright post and thereby being mounted for pivoting about said first pivot axis and having a first leg and a second leg; a steering output plate being fixed to said second upright post and thereby being mounted for pivoting about said second pivot axis; a connecting link extending at least generally parallel to said speed and direction control arm and having opposite ends respectively pivotally coupled to said second leg of the steering input bell crank and to a first pivot location of said steering output plate, with the distance between the connection of the connecting link with the second leg of the steering input bell crank and the first upright axis being substantially equal to the distance between the connection of the connecting link with the output plate and the second pivot axis; first and second motion transfer links having respective first ends coupled to said output plate at second and third locations spaced substantially equally from opposite sides of said second pivot axis, and having respective second ends coupled to first and second displacement control arms of said first and second pumps; a steering cylinder having a fixed barrel through which extends a piston rod; a lost-motion connection coupling an end of said piston rod to said first leg of the steering input bell crank such that the speed of rotation of the steering input bell crank decreases as the steering cylinder moves the steering input bell crank from a neutral position corresponding to a neutral position of the displacement control arms of the first and second pumps; one end of said speed and direction control arm being is defined by an upright sleeve arrangement mounted for rotation about said first upright axis; a fixed U-shaped sensor mounting member having first and second horizontal legs respectively disposed adjacent an upper surface of said steering input bell crank and adjacent a lower surface of said sleeve arrangement of the speed and direction control arm; a steering input motion sensor being mounted to said first horizontal leg and disposed for sensing rotation of said steering input bell crank; and a speed and direction output sensor being mounted to said second horizontal leg and disposed for sensing rotation of said speed and direction control arm about said first upright axis.

16. The steering control linkage, as defined in claim 15, wherein said steering input motion sensor and said speed and direction control arm rotation sensor are each rotary potentiometers.

\* \* \* \* \*